(12) United States Patent
Metselaar (10) Patent No.: US 12,266,258 B2
(45) Date of Patent: Apr. 1, 2025

(54) VIDEO DOORBELL WITH CHIME CONTROLLER

(71) Applicant: ECOBEE TECHNOLOGIES ULC., Toronto (CA)

(72) Inventor: John Theodore Metselaar, Port Rowan (CA)

(73) Assignee: GENERAC POWER SYSTEMS, INC., WI (US)

( * ) Notice: Subject to any disclaimer, the term of this patent is extended or adjusted under 35 U.S.C. 154(b) by 85 days.

(21) Appl. No.: 17/900,211

(22) Filed: Aug. 31, 2022

(65) Prior Publication Data

US 2023/0066779 A1    Mar. 2, 2023

Related U.S. Application Data

(60) Provisional application No. 63/239,404, filed on Aug. 31, 2021.

(51) Int. Cl.
*G08B 3/10* (2006.01)
*H04N 7/18* (2006.01)

(52) U.S. Cl.
CPC .............. *G08B 3/10* (2013.01); *H04N 7/186* (2013.01)

(58) Field of Classification Search
CPC ................... G08B 3/10; H04N 7/186

USPC ......................................... 340/328
See application file for complete search history.

(56) References Cited

U.S. PATENT DOCUMENTS

| | | | | |
|---|---|---|---|---|
| 9,859,741 | B1* | 1/2018 | Beagley | G08B 3/10 |
| 2019/0149775 | A1* | 5/2019 | Alamgir | G08B 13/1966 348/143 |
| 2023/0230461 | A1* | 7/2023 | Zuo | G08B 3/10 340/393.3 |

* cited by examiner

*Primary Examiner* — Kam Wan Ma
(74) *Attorney, Agent, or Firm* — Perry + Currier Inc.

(57) ABSTRACT

A video doorbell system operable to generate a chime sound, comprises a transformer, operable to convert a premise's power supply to a suitable. The video doorbell system further includes a video doorbell having a processor, a video camera and a wireless communication module. The video doorbell is electrically connected to the transformer by a two-wire interface. The processor within the video doorbell operable to generate a chime signal using power supplied from the two-wire interface when a doorbell button is depressed. The video doorbell system further includes a chime controller, electrically connected to the transformer and the video doorbell by the two-wire interface. The video doorbell system continues to provide sufficient power to the video doorbell from the transformer via the two-wire interface so as to be able to operate the processor, video camera and wireless communication module while the doorbell button is currently depressed.

5 Claims, 11 Drawing Sheets

VIDEO DOORBELL WITH CHIME CONTROLLER

The present application claims benefit of U.S. Provisional Application No. 63/239404, filed Aug. 31, 2021, the entire disclosure of which is hereby incorporated herein by reference.

FIELD OF THE INVENTION

The present invention relates to doorbell systems. More specifically, the present invention relates to a video doorbell system having a video doorbell and a chime controller, powered over two wires. The two wires provide full power to the video doorbell and a return-signaling method to activate the indoor chime.

SUMMARY OF THE INVENTION

It is an object of the present invention to provide a novel thermostat device which obviates or mitigates at least one disadvantage of the prior art.

According to an embodiment of the invention, there is provided a video doorbell system operable to generate a chime sound, comprising a transformer, operable to convert a premise's power supply to a suitable voltage for the video doorbell system. The video doorbell system further includes a video doorbell, the video doorbell having at least a processor, a video camera operable to record video, and a wireless communication module operable to transmit video from the video camera across a remote network, the video doorbell being electrically connected to the transformer by a two-wire interface, the video doorbell further having a doorbell button, the processor within the video doorbell operable to generate a chime signal using power supplied from the two-wire interface when the doorbell button is depressed. The video doorbell system further includes a chime controller, electrically connected to the transformer and the video doorbell by the two-wire interface, the chime controller operable to receive the chime signal across at least one wire of the two-wire interface and activate a chime generator to generate a chime sound. The video doorbell system continues to provide sufficient power to the video doorbell from the transformer via the two-wire interface so as to be able to operate the processor, video camera and wireless communication module while the doorbell button is currently depressed.

BRIEF DESCRIPTION OF THE DRAWINGS

Preferred embodiments of the present invention will now be described, by way of example only, with reference to the attached Figures, wherein.

BACKGROUND OF THE INVENTION

Figure 1:
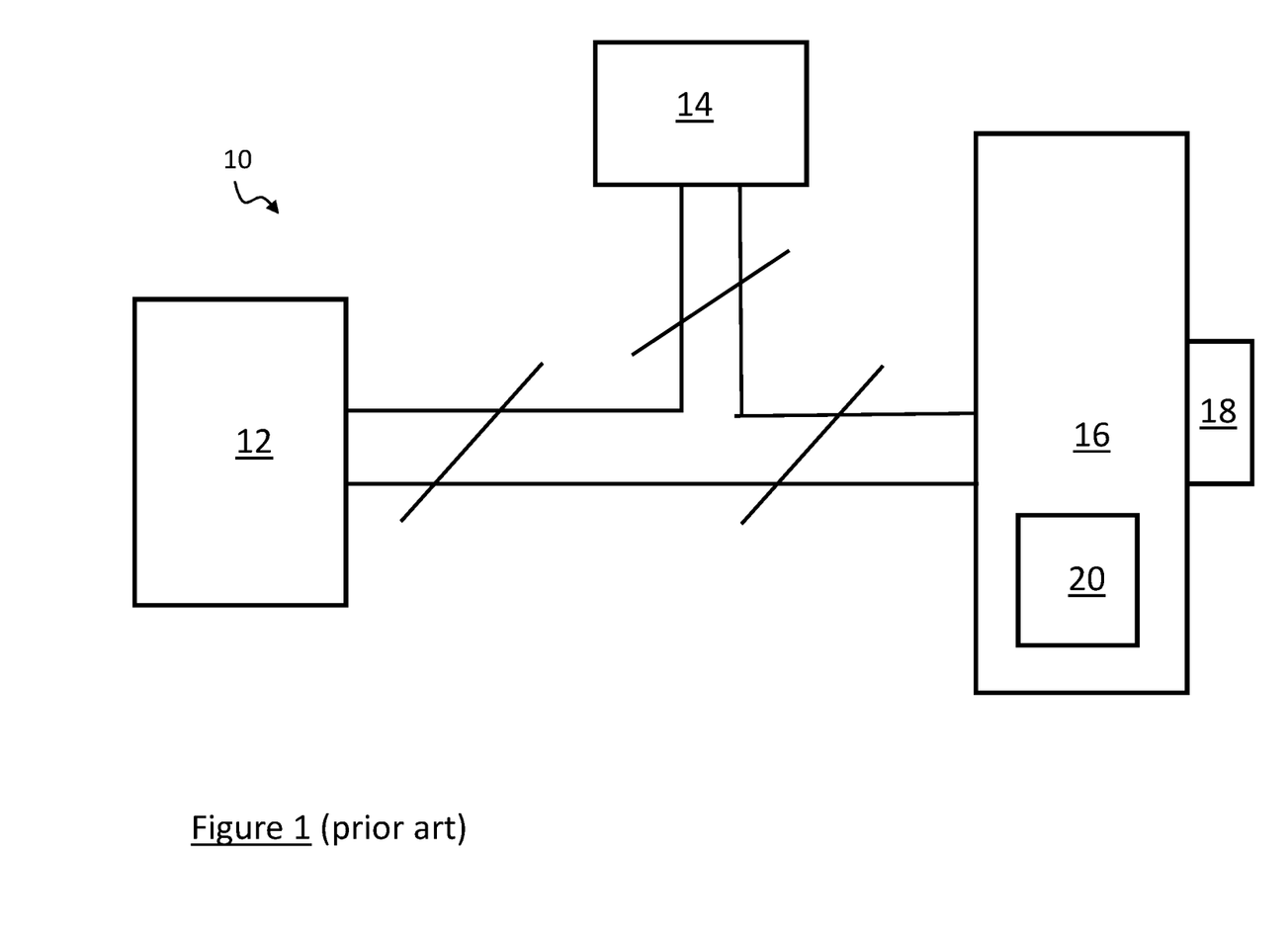
FIG. 1 shows a block diagram of a prior art doorbell system.

A typical prior art doorbell system (as shown in FIG. 1) generally at 10 is a simple system, consisting of three major components: a transformer 12, an indoor chime 14 and a doorbell 16 having a doorbell button 18 (typically located outside the premise). Transformer 12 transforms a premise's 120 VAC to 16-24 AC. A two-wire interface (16-24 VAC) go from the transformer 12 to the indoor chime 14 (typically located within the premise) and two wires go from the indoor chime 14 to the (outdoor) doorbell 16 to create the circuit as shown. When doorbell button 18 on doorbell 16 is depressed the circuit completes and the indoor chime 14 is powered for the duration the doorbell button 18 is being pressed in order to create a chime noise. When doorbell button 18 is released, the circuit disconnects power to the indoor chime 14.

More recently, video capabilities have been added to doorbell systems. Many of these video-capable doorbell systems are retrofitted within a premise using the pre-existing two-wire interface. While the conventional doorbell system 10 is simple in design, installation and operation, there is a challenge when adding video capabilities to the doorbell 16 using the existing two-wire interface. Typically, a video doorbell requires power at all times in order to power its CPU and video camera. But to activate the indoor chime 14, the two wires to a video-capable doorbell must commutate so that indoor chime 14 can be activated. This commutation of the two wire disrupts the power going to the (video-capable) doorbell 16 for the duration the doorbell button 18 is pressed. In order to provide video capability, prior art doorbell systems 10 using two-wire interfaces overcome this power disruption by having an internal rechargeable battery 20 located within doorbell 16 to provide constant power to the video doorbell circuitry for the duration that doorbell button 18 is pressed. When doorbell button 18 is not pressed, a small amount of the power from the two-wire interface is used to recharge battery 20, ready to provide backup power on the next press of doorbell button 18.

There are a few problems with using a rechargeable battery 20 for doorbell 16. The rechargeable battery 20 does not perform well in extreme cold temperatures. The capacity of the rechargeable battery 20 reduces over time, reducing the overall lifespan of doorbell 16. Elevated temperatures within the housing of doorbell 16 can further reduce the longevity of the rechargeable battery 20. Rechargeable battery 20 adds bulk and cost to the product. In addition, having a rechargeable battery 20 in doorbell 16 which will ultimately be disposed of, which is not environmentally friendly. It is desirable to have a doorbell system which obviates at least some of the problems of the prior art.

DETAILED DESCRIPTION OF THE INVENTION

Figure 2:
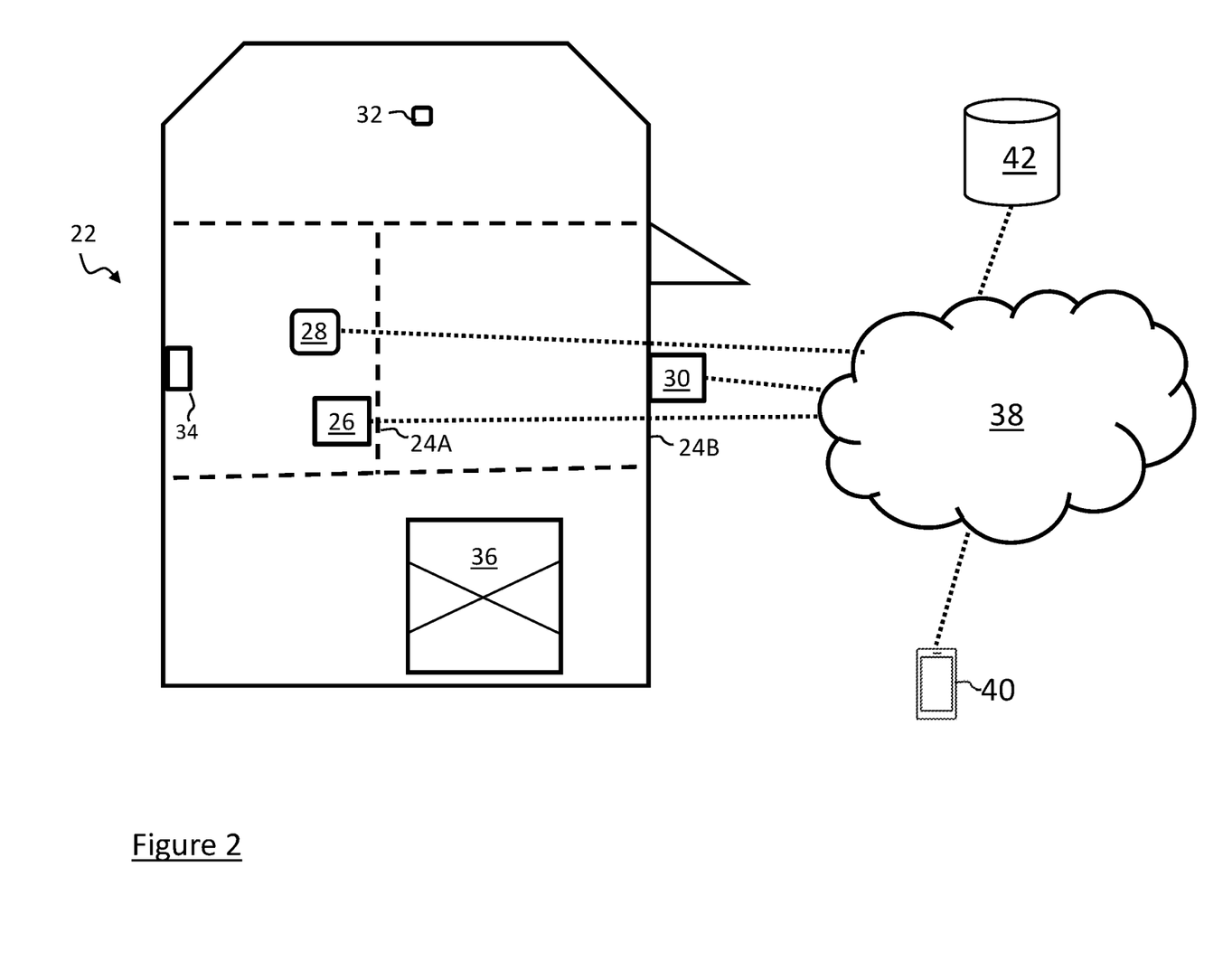
FIG. 2 shows a schematic representation of a premise containing a video doorbell system in accordance with an embodiment of the invention.

Referring now to FIG. 2, a premise is shown generally at 22. Premise 22 is typically a residential home, but in some embodiments, could also be a commercial building. Premise 22 is defined by and subdivided into multiple rooms (functionally, the kitchen, bedroom, hallway, etc.) by a plurality of walls 24. Some walls 24 are interior walls 24A (including both load-bearing and non-load bearing walls) and some are exterior walls 24B (thicker load-bearing walls, preferably well insulated). For simplicity, other features of premise 22 such as doors, windows, stairs, etc. have been omitted from FIG. 2.

Premise 22 includes a plurality of smart devices, which can be considered either "hub" devices or "remote" devices. While not a strict delineation, hub devices are powered by the premise's 120 VAC electrical wiring (not depicted) and thus can have robust communication and computational abilities such as Wi-Fi and video streaming, whereas remote devices have constrained power, communication and computational abilities. As will be described in greater detail below, remote devices communicate with each other and/or hub devices locally within premise 22, whereas hub devices are also operable to communicate with remote servers outside of premise 22 via a network 38. In the present embodiment, hub devices include a smart thermostat 26, smart camera 28 and a video doorbell system 30. Remote devices in the present embodiment include remote sensors 32 and contact sensors 34. Other remote devices such as sirens and leak sensors (neither depicted) are also contemplated. Collectively, the hub and remote devices support a plurality of home automation applications.

Premise 22 further includes a HVAC system 36, which may include various heating and cooling systems furnaces, air conditioning systems, fans, heat pumps, humidification/dehumidification systems and the like. HVAC system 36 is preferably controlled by smart thermostat 26.

Network 38 can include a local area networks (LAN) as well as connectivity to the Internet via a router (not depicted) or communication over a cellular network. Network 38 can also include mesh networks that facilitate communication between hub and remote user devices 40. The remote user devices 40 may communicate with the hub devices (such as smart thermostat 26 or video doorbell system 30) directly on same network 38 or indirectly via a remote server 42 across the Internet. Remote user devices 40 can include smart phones, smart watches, tablets as well as personal computers. These remote user devices 40 can control hub devices such as smart thermostat 26 or view video content from smart camera 28 or video doorbell system 30.

In many embodiments, remote server 42 acts as an intermediary between the remote user device 40 and the hub device within premise 22, and routes information and commands between the two. In addition, remote server 42 may provide additional functionality (in the form of Software as Service, or SaaS), such as energy modeling, computationally intensive machine learning, video data storage, historical runtime reports, time and weather services, as well as third-party voice processing services such as the Amazon Alexa service. Remote server 42 can also be used to provide alerts and notifications to remote user devices 40 when they lose connection to the devices within premise 22 (such as Wi-Fi being down) or when power is out in premise 22.

As mentioned previously, smart thermostat 26 is operable to act as a hub device. In the illustrated embodiment, smart thermostat 26 is a wireless communicating thermostat, such as the ecobee3lite or ecobee Smart Thermostat with Voice. Preferably, smart thermostat 26 is equipped with wireless communication protocols such as Wi-Fi or Bluetooth to connect to the network 38 to provide for remote control of smart thermostat 26 from the remote user device 40. The remote user devices 40 may communicating with smart thermostat 26 directly on same network 38 or indirectly via the remote server 42 across the Internet.

Smart thermostat 26 is further in wireless communication with a one or more remote sensor(s) 32, which can provide different sensor readings such as occupancy, temperature, humidity, as well as CO or CO2 values to smart thermostat 26 (via wireless protocols such as 802.11, Bluetooth, Zigbee HA or through a proprietary 900 MHz protocol). Smart thermostat 26 is operable to communicate with remote sensor(s) 32 to provide occupancy and temperature averaging for its readings, and then prioritize temperature values in rooms 12 where occupancy is detected, and/or reduce the usage of HVAC system 36 when no occupancy is detected within premise 22 for an extended period of time. Smart thermostat 26 may also include its own occupancy sensor. Preferably, smart thermostat 26 also includes a touchscreen, a microphone and speaker. In some embodiments, the touchscreen and speakers on smart thermostat 26 can act as an output for video streams provided by smart camera 28 or video doorbell system 30, or for door chime signals generated by video doorbell system 30.

Figure 3A:
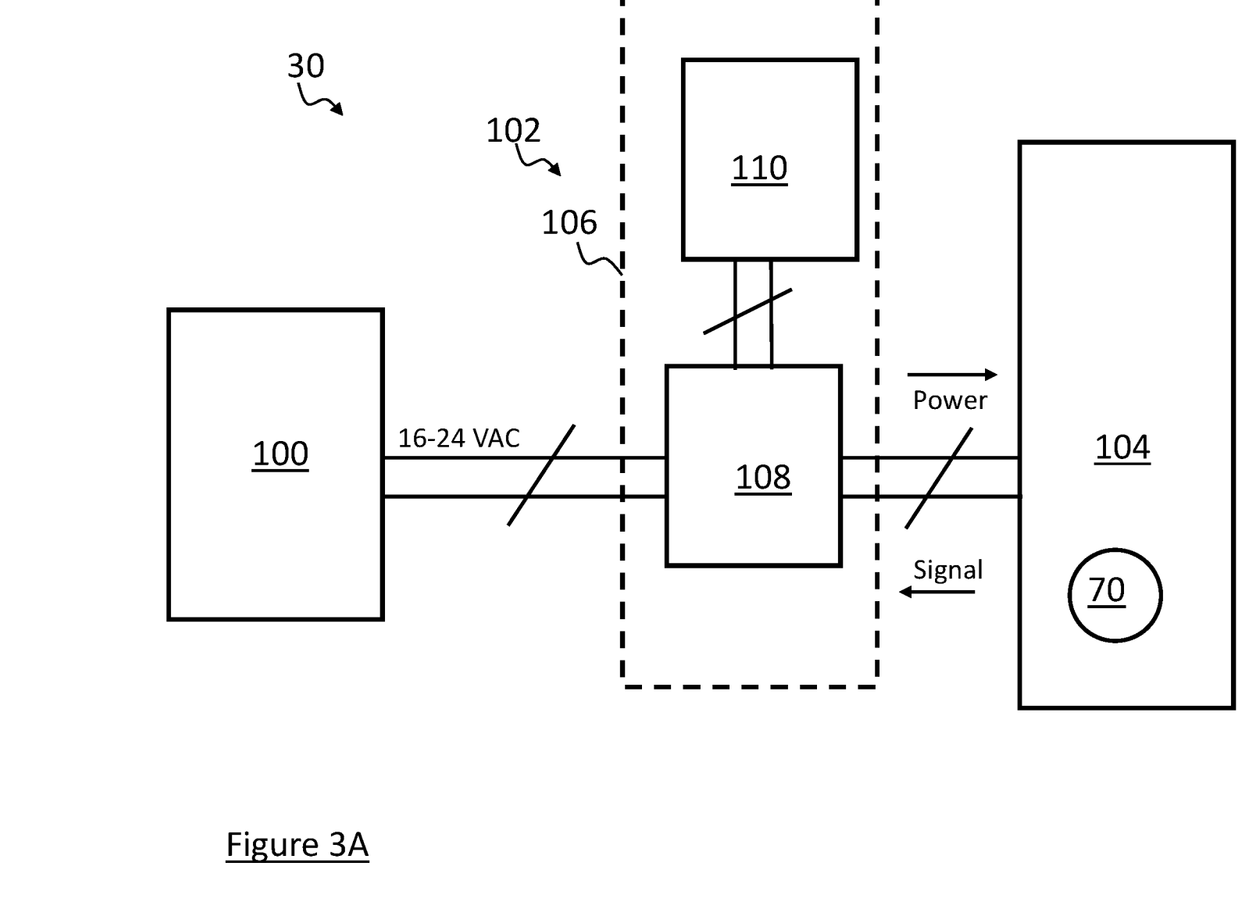
FIG. 3A shows an electrical block diagram of the video doorbell system shown in FIG. 2.
Figure 3B:
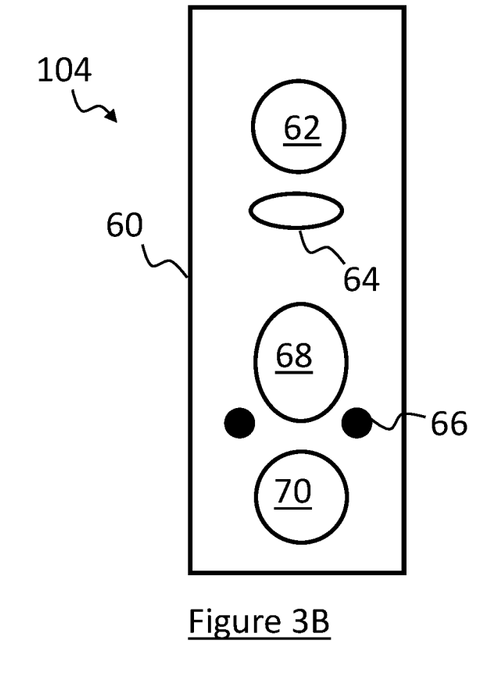
FIG. 3B and 3C show schematic representation of the components of the video doorbell shown in FIG. 3A.
Figure 3C:
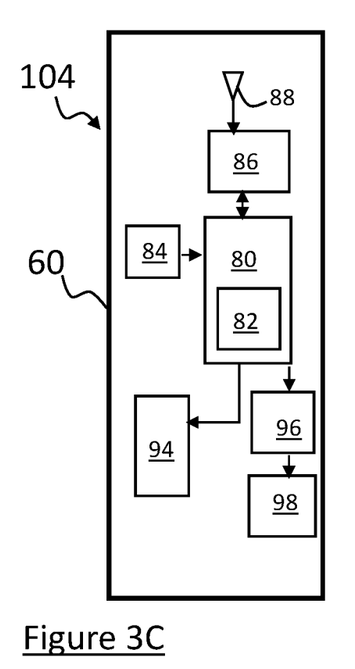

Referring now to FIGS. 3A, 3B and 3C, an embodiment of the invention is shown in greater detail. Video doorbell system 30 (FIG. 3A) includes a transformer 100 (located within premise 22), a chime 102 (located within premise 22) and a video doorbell 104 which is adapted to be installed on the outside of premise 22 on an external wall. Transformer 100, chime 102 and video doorbell 104 are all connected by a standard two-wire interface.

Referring to FIG. 3B and 3C, the hardware components of video doorbell 104 are described in greater detail. External hardware components of video doorbell 104 (FIG. 3B) include a weather-proof housing 60, a doorbell button 70, a video camera 62 and IR lighting 64 (typically all forward facing). Doorbell button 70 is typically a plunger-style actuator operable to generate a door press signal in processor 80 (described below). Video doorbell 104 may also include one or more microphone apertures 66 which allow sounds from outside housing 60 to reach one or more internal microphones (described below) and a speaker grate 68 which allows sounds emitted from an internal speaker (discussed below) to exit housing 60.

Internal components of video doorbell 104 (FIG. 3C) include includes the processor 80, which can be a microprocessor, or any other suitable device as will occur to those of skill in the art. Video doorbell 104 further includes memory 82, which can be non-volatile RAM and/or volatile RAM which is accessible by processor 80. As will be apparent to those of skill in the art, memory 82 can be integral with processor 80, or can be separate discrete devices or components, as desired. Typically, memory 82 will store one or more programs for execution by processor 80 (such as a camera detection program and local video storage). Video doorbell 104 may also include at least one environmental sensor 84, which at a minimum is a temperature sensor operable to determine the current outdoor temperature, but can also include other environmental sensors, such as a humidity sensor.

A communication module 86 connected to processor 80 to allow processor 80 to communicate with network 38 (i.e., the Internet) and/or with additional external sensors or computerized devices (not shown). Preferably, communication module 86 is operable to connect to the desired data networks wirelessly, via an antenna 88, using at least one wireless communication protocol, such as Wi-Fi; Bluetooth; ZigBee; ZWave; Cellular Data, etc. Communication module 86 also allows video doorbell 104 to communicate with Internet based services running on remote servers 42 and with applications used remotely on remote user devices 40. For example, a user remote from video doorbell 104 may access an application executing on a smartphone (remote user device 40) or personal computer to watch live streaming from video camera 62.

Video doorbell 104 further includes a control block 94, which is adapted to connect to a standard two-wire interface found within premise 22. Control block 94 provides the power supply and generates control signals across the two-wire interface within video doorbell system 30, and is described in greater detail below.

The hardware in video doorbell 104 further includes an audio output subsystem 96, which is operable in response to signals received from processor 80, to output an amplified audio signal to a speaker 98 (which is arranged to output sound through speaker grate 68). Audio output subsystem 96 can be a discrete device, or combination of suitable discrete devices, as desired and is preferably capable of outputting voice signals and/or simulated door chime sounds.

Referring back now to FIG. 3A, an embodiment of the invention is shown in greater detail. Transformer 100 is adapted to transform premise 22's 120 VAC power supply (not depicted) into 16-24 VAC. Transformer 100 is connected to chime 102 by a standard two-wire interface. Chime 102 includes a chassis 106 (located within premise 22). Inside chassis 106 is a chime controller 108 and a chime generator—in the present embodiment a chime solenoid 110. Chime controller 108 is connected to video doorbell 104 via the standard two-wire interface. Transformer 100 feeds power to chime controller 108 and to chime solenoid 110 when the doorbell button 70 on the video doorbell 104 is pressed. Chime controller 108 provides connectivity to the chime solenoid 110. When signaling from video doorbell 104 (described in greater detail below) is present (i.e., the doorbell button 70 is pressed), the chime solenoid 110 is energized for one or two seconds, causing an armature to strike a sound plate (neither depicted) to create the chime sound.

Chime controller 108 further provides connectivity to video doorbell 104. Unlike the prior art system shown in FIG. 1, power is continuously provided to video doorbell 104, regardless of whether the doorbell button 70 is pressed or not. Instead, video doorbell 104 provides special signaling to chime controller 108 when the doorbell button 70 is pressed. The special signalling is decoded by chime controller 108, which causes chime solenoid 110 to be briefly powered to create the chime sound (described above).

Figure 4A:
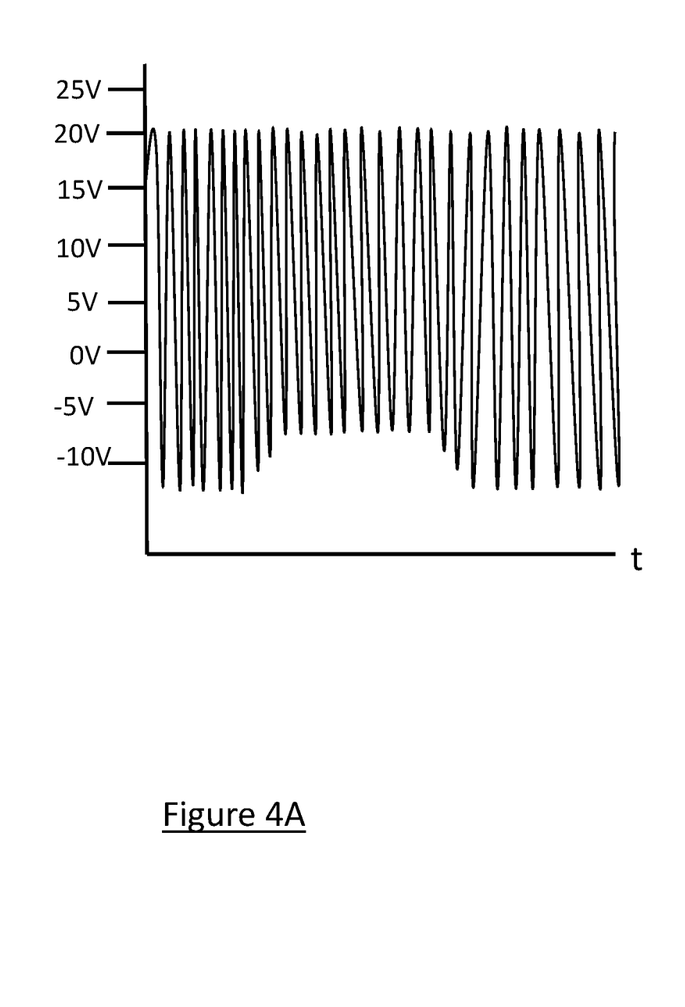
FIG. 4A shows a simulation chart of voltage over time between the video doorbell and a chime controller for the video doorbell system shown in FIG. 3.
Figure 4B:
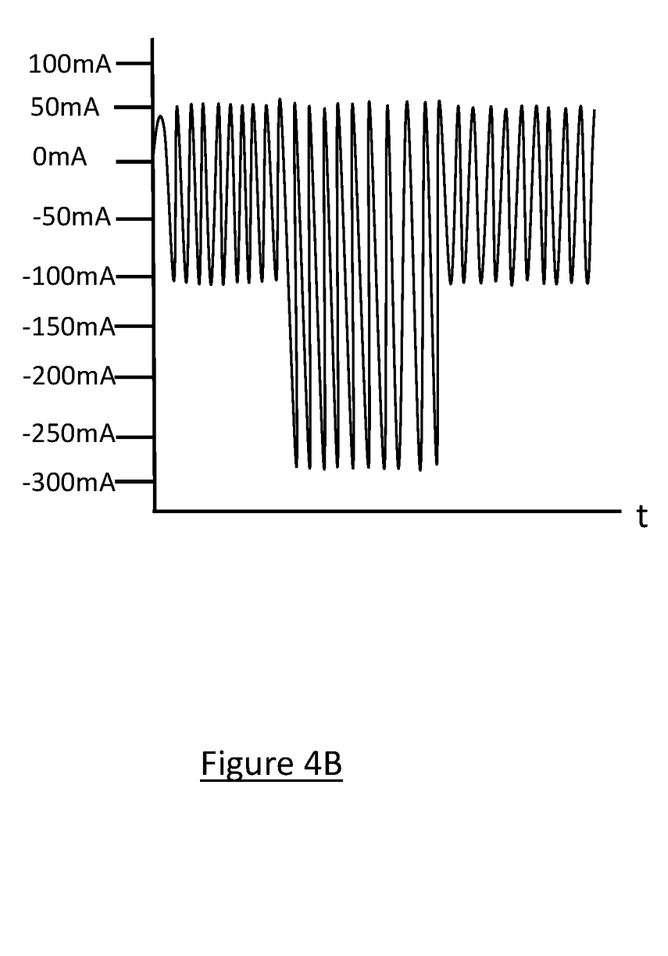
FIG. 4B shows a simulation chart of current over time between the video doorbell and the chime controller for the video doorbell system shown in FIG. 3.

This special signaling ("call for chime") comes in the form of sinking extra current on the negative excursions of the voltage sinusoid for the one or two seconds when the doorbell button 70 is pressed. When chime controller 108 detects this excessive current, its circuitry activates chime solenoid 110. FIG. 4A shows a simulation of what happens on the two-wire interface between the video doorbell 104 and chime controller 108 when the doorbell button 70 is pressed and there is a call for a chime (the waveform has been simplified for the purposes of illustration). The voltage is slightly reduced, but only on the negative sinusoid. The positive sinusoid remains intact. Video doorbell 104 sees this voltage as acceptable for its operation, although reduced overall amplitude, and still carries AC voltage and current over the two-wire interface. FIG. 4B shows what the current consumption looks like on the two-wire interface during the signalling of a doorbell button 70 press which is a call for chime (waveform has been simplified for the purposes of illustration). The majority of negative current is being sunk at the time there is a call for chime. When there is no chime signaling, the current shown is the normal operating current of the video doorbell 104. Chime controller 108 detects this current envelope and activates the chime solenoid 110.

Figure 5:
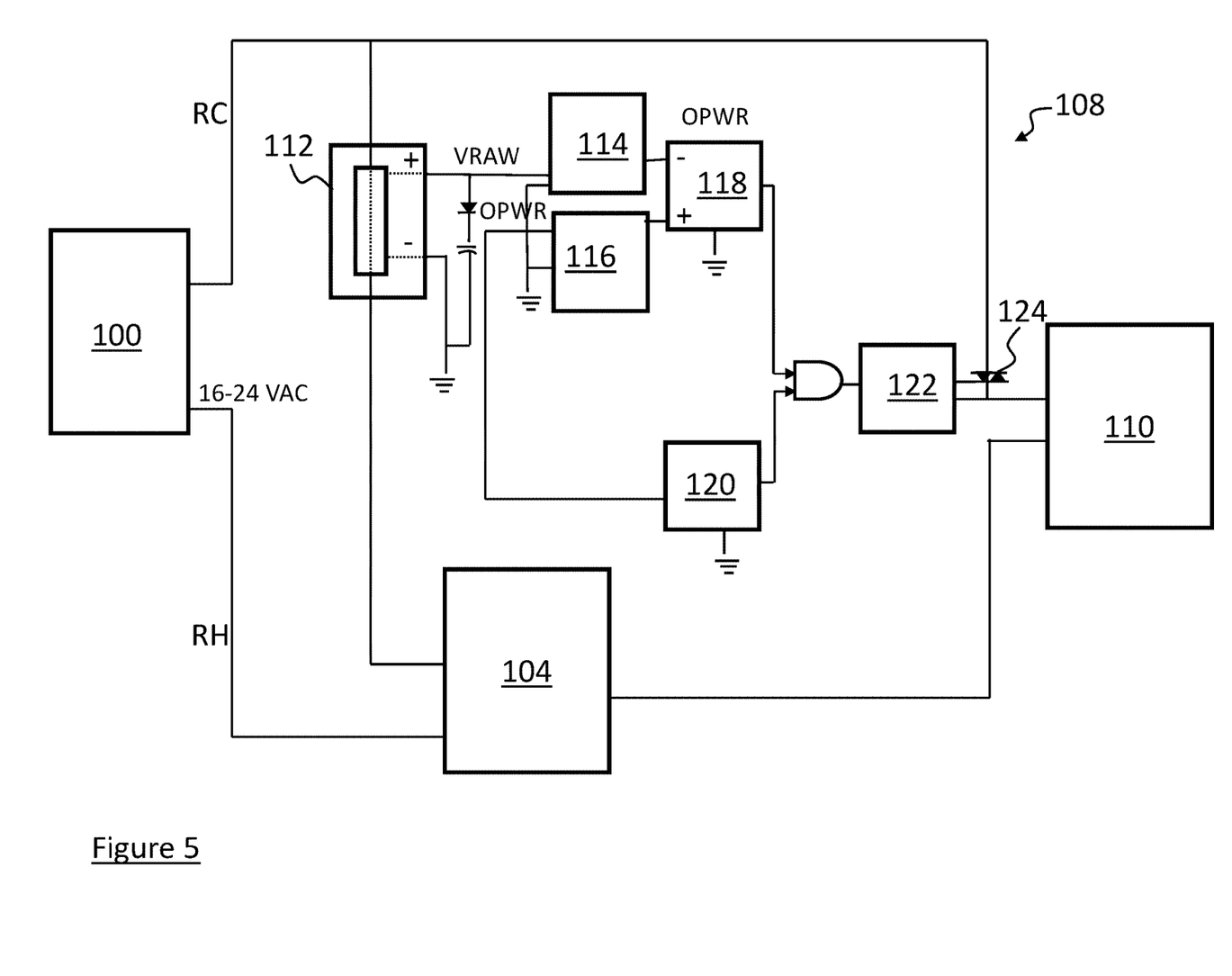
FIG. 5 shows an electrical block diagram of the video doorbell system shown in FIG. 3.

FIG. 5 provides a block diagram of chime controller 108 shows the electrical processing from transformer 100 to chime solenoid 110. As mentioned previously, transformer 100 transforms the premise's 120 VAC to 16-24 VAC. Two wires exit from transformer 100, RC and RH. RC passes through current to voltage detector (12V) 112. RC passes through the current to voltage detection (12V) 112 and then onward to the video doorbell 104. Current to voltage detector (12V) 112 consists of a full wave current rectifier and a filtered current to voltage convertor. The output of current to voltage detector (12V) 112 is a voltage level that is representative of the current consumption of the video doorbell 104 with respect to a virtual ground. As the current to the video doorbell 104 increase/decreases so does the Voltage (VRAW) output of the current to voltage detector (12V) 112.

The full wave current rectifier in current to voltage detector (12V) 112 passes current to the video doorbell 104 on the positive and negative current sinusoid. Half of the current sinusoid is fully passed to the video doorbell 104. The other half of the current sinusoid is processed to generate a local voltage (VRAW) with a virtual ground and then passed to the video doorbell 104. In this way the video doorbell 104 gets all the current it needs to operate. The voltage to the video doorbell 104, however, is slightly altered (as previously shown).

The output of voltage detector (12V) 112 (VRAW) is filtered into a power domain called OPWR which feeds the rest of the detection circuit.

Figure 6:
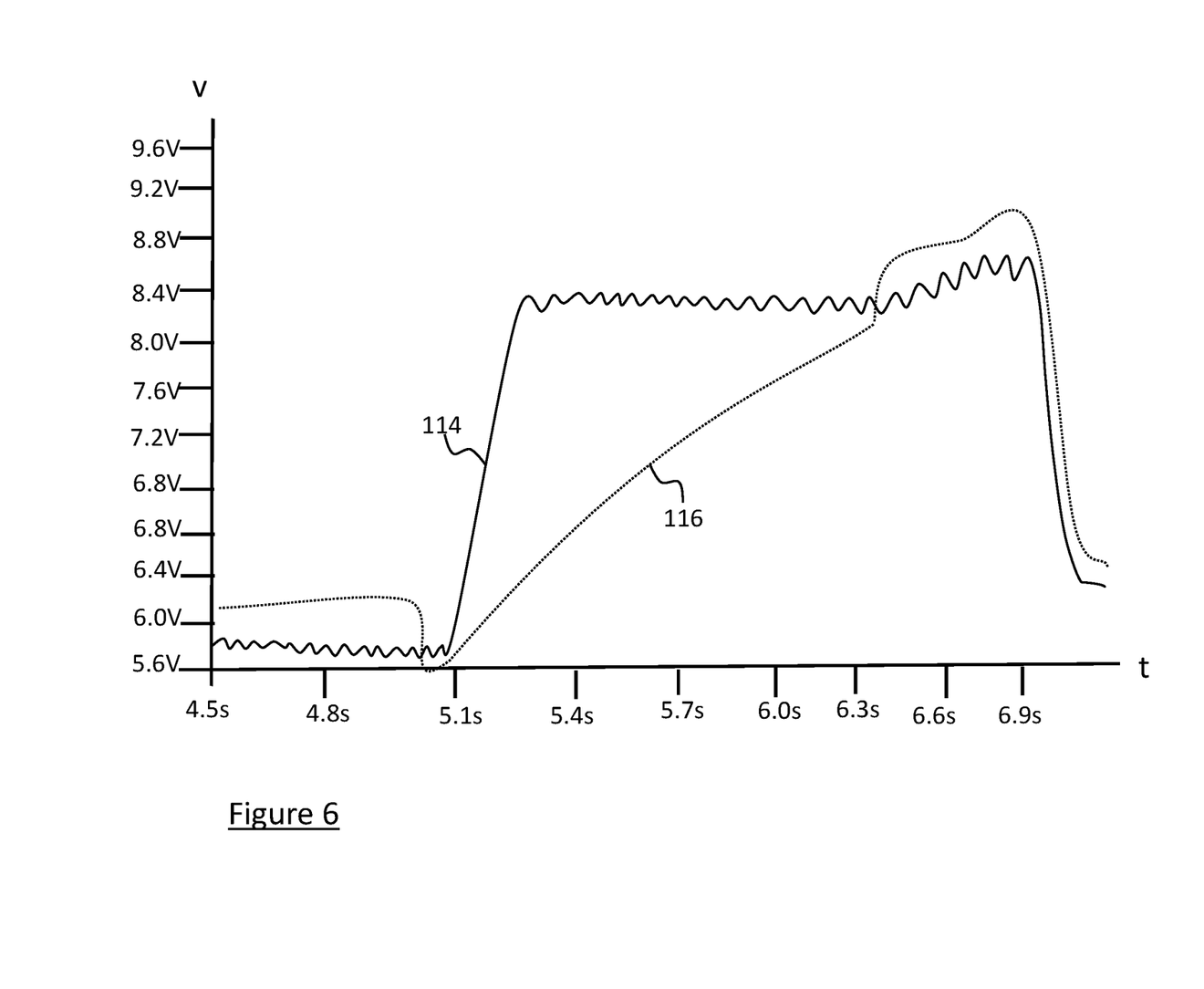
FIG. 6 shows a simulation of chart of voltage delays over time used within the video doorbell system shown in FIG. 3.

VRAW and OPWR feed into time delay circuits, TD 114 and TD 116 respectively before going into a comparator 118. The output of TD 114 (VREF) goes into the minus of comparator 118. It has the faster time constant compared to TD 116 (VNODE). The difference in time delays is shown in the timing diagram shown in FIG. 6 (voltage waveforms have been simplified for the purposes of illustration). As can be seen, when there is a rapid change in current consumption, TD 114 (VREF) quickly raises to a representative voltage level. Meanwhile TD 116 (VNODE) slowly catches up to TD 114 voltage level. When TD 114 equals in voltage to TD 116 the hysteresis of comparator 118 kicks in to switch the output polarity. The time TD 114 voltage level remains above TD 116 voltage is the duration the chime solenoid 110 is activated. In the illustration shown in FIG. 6, this is approximately 1.5 seconds. Elements of TD 114 and TD 116 may be adjusted to change the time the chime solenoid 110 is active (and thus, the length of the chime sound).

The time delay circuits, TD 114 and TD 116 are comprised of resistor and capacitors components (not individually depicted). At start-up, there is no initial voltage on the capacitors. As power is applied to the chime controller 108, the behavior of TD 114 and TD 116 is indeterminant and will cause the comparator 118 output to oscillate. This in effect will cause the chime solenoid 110 to erratically activate as power stabilizes to the system and initializes all capacitor reference voltages. To disable this start-up erratic behavior, a DWELL circuit 120 is provided that blocks an opto-triac circuit 122 from activation for a certain length of time while system voltages are stabilizing. Once the DWELL circuit 120 achieves the hold off time period, it allows comparator 188 to control opto-triac circuit 122. In this way any inadvertent chime solenoid 110 activations are blocked as power is connected to the system.

The opto-triac circuit 122 is an AC switch to turn on and off the chime solenoid 110. Opto-triac circuit 122 is used to provide isolation to the OPWR subsystem while controlling the AC voltage. The opto-triac circuit 122 feeds into a power triac 124 to take care of the heavy current demands of the chime solenoid 110.

Figure 7:
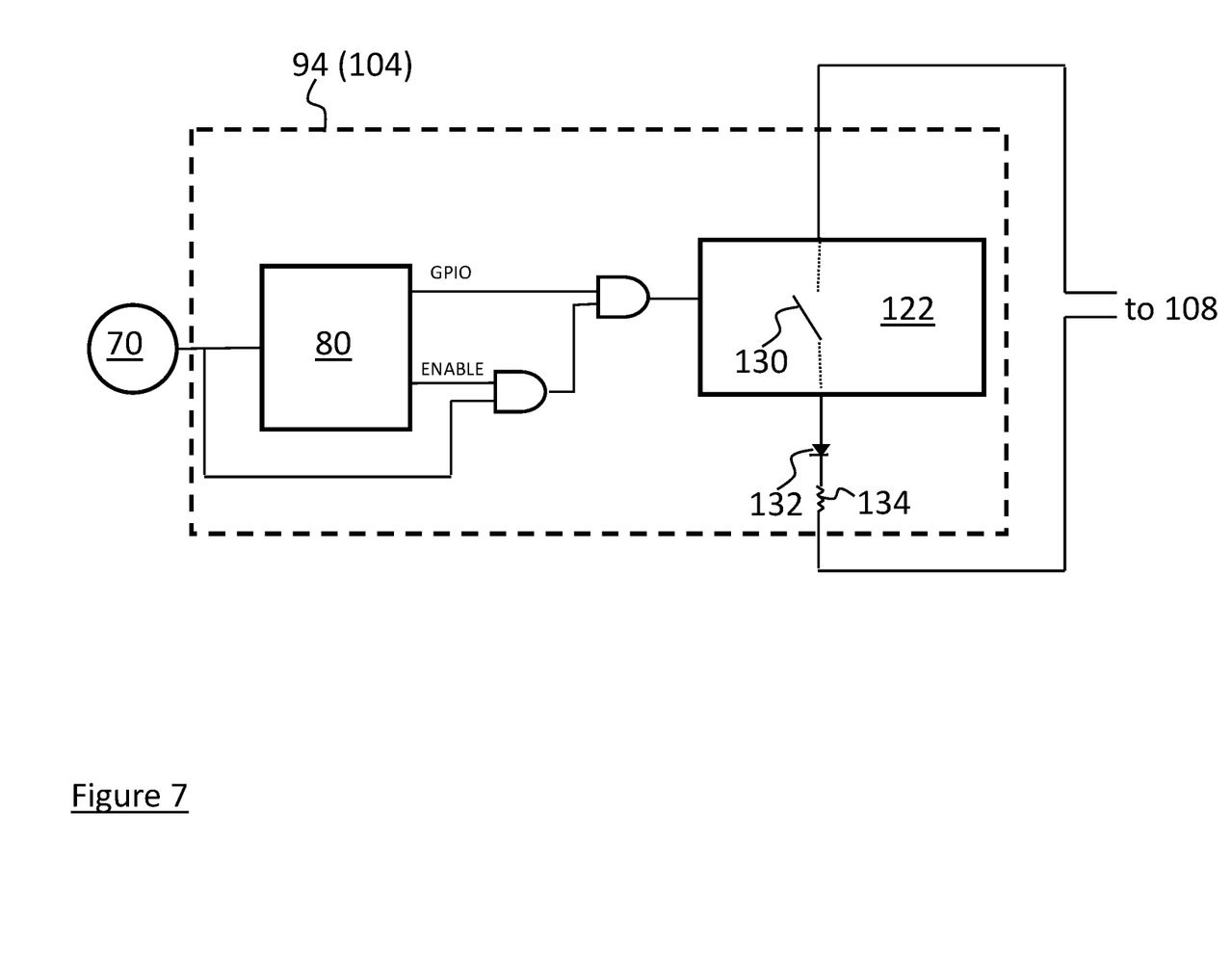
FIG. 7 shows an electrical block diagram of signalling current within the video doorbell system shown in FIG. 3.
Figure 8:
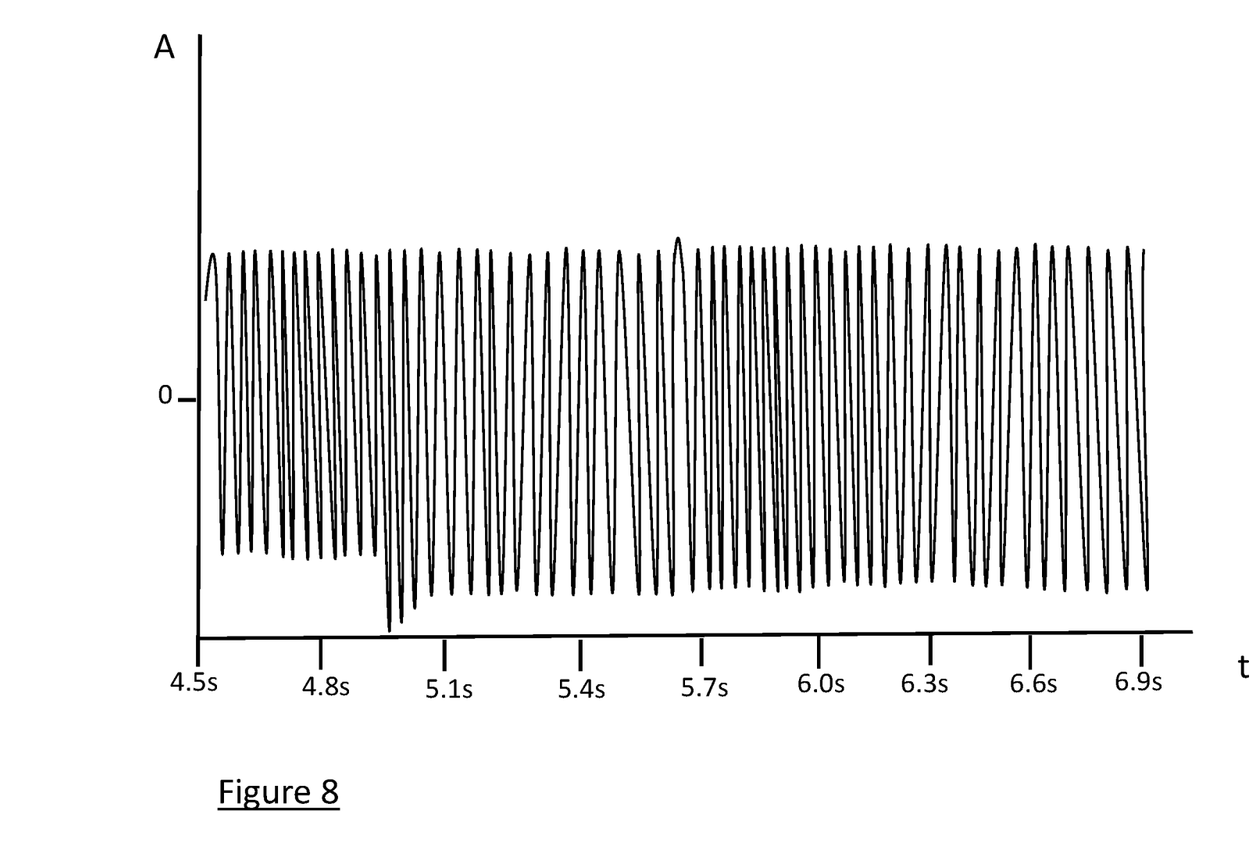
FIG. 8 shows a simulation chart of current imbalance over time in the signalling current within the electrical block diagram shown in FIG. 7.

FIG. 7 provides a simplistic block diagram of the control block 94 in video doorbell 104, showing how the signaling current (call for chime) is created from a press of the doorbell button 70. A processor 80 monitors the doorbell button 70 press as shown on the left side of FIG. 7. After a doorbell button 70 press detection, processor 80 debounces the doorbell button 70 signal and registers a valid doorbell button 70 press. A general input/output signal (GPIO) is then generated to activate an LED 130 in the opto-triac circuit 122. The opto-triac circuit 122 allows half the current sinusoid with the help of a diode 132 to sink current through a resistor 134. This current is supplemental to the current that the video doorbell 104 consumes during normal operation. While the opto-triac circuit 122 is commutating, a current imbalance is created for half the sinusoid for the duration the doorbell button 70 is pressed, i.e., half the sinusoid is larger in current than the other half of the sinusoid. FIG. 8 provides a diagram for what is seen through simulation with the situation described above (waveform has been simplified for the purposes of illustration). Further to the block diagram shown in FIG. 7, there is an option for the doorbell button 70 to directly control the opto-triac circuit 122. This may happen if somehow processor 80 fails to boot, then video doorbell 104 should still be able to operate chime 102.

Figure 9A:
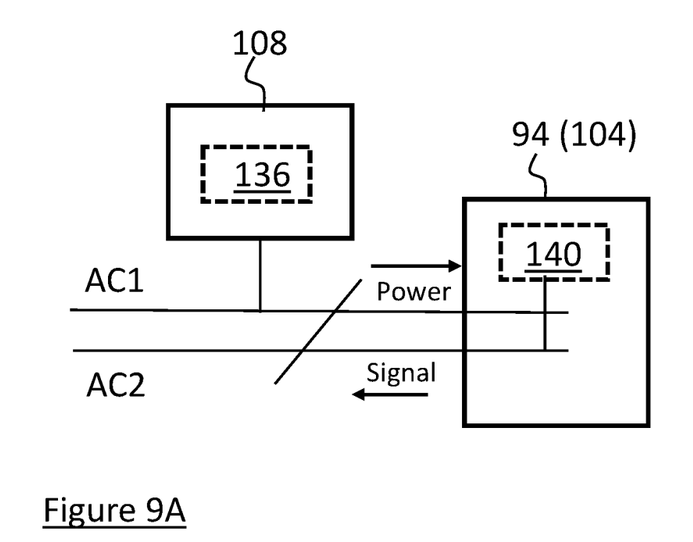
FIG. 9A shows an electrical block diagram of an incorrectly-wired video doorbell system shown in FIG. 3.
Figure 9B:
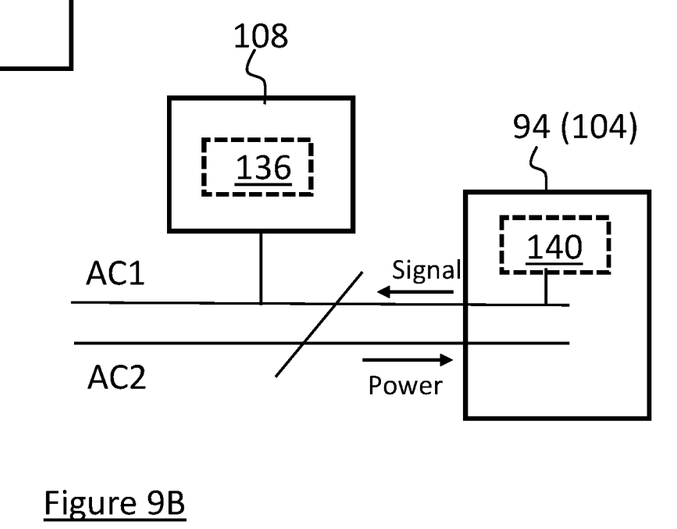
FIG. 9B shows an electrical block diagram of a correctly-wired video doorbell system shown in FIG. 3.

Referring now to FIGS. 9A and 9B, for chime controller 108 to work properly, an inline detection circuit 136 located within must coincide with the same AC line that the video doorbell 104 uses to create the signaling current via a signalling current generator 140. This poses a potential problem with installation of video doorbell 104 because there is typically no marking on each of the two wires to indicate the proper polarity that would connect to the video doorbell 104 other than by trial and error. FIG. 9A (incorrect installation) and FIG. 9B (correct installation) illustrates the problem.

Figure 10:
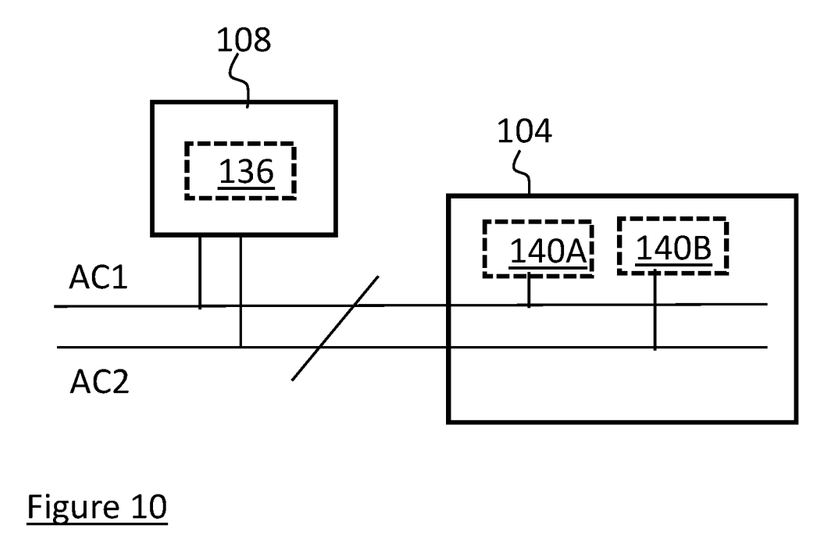
FIG. 10 shows an electrical block diagram of another embodiment of the video doorbell system shown in FIG. 3.

Referring now to FIG. 10, an embodiment of the invention is provided which overcomes the installation problem shown in FIGS. 9A and B and make connectivity wiring-agnostic. In the embodiment shown in FIG. 10, the inline detection circuit 136 in chime controller 108 connects to both wires AC1 and AC2. In addition, within video doorbell 104, there are two signaling current generators, 140A and 140B to generate signalling current for each of the two wires AC1 and AC2. In this way, it does not matter how the two AC wires would connect between the chime 102 and the video doorbell 104. With a doorbell button 70 press both signaling current generators 140A and 140B activate to generate the chime signal, and detection circuit 136 will detect either.

The above-described embodiments of the invention are intended to be examples of the present invention and alterations and modifications may be affected thereto, by those of skill in the art, without departing from the scope of the invention which is defined solely by the claims appended hereto.

What is claimed is:

1. A video doorbell system operable to generate a chime sound, comprising:
    a transformer, operable to convert a premise's power supply to a suitable voltage for the video doorbell system;
    a video doorbell having:
        a video camera operable to record video,
        a wireless communication module operable to transmit video from the video camera across a remote network, the video doorbell being electrically connected to the transformer by a two-wire interface,
        a doorbell button,
        a processor operable, when the doorbell button is depressed, to generate a chime signal using power supplied from the two-wire interface when the doorbell button is depressed, and to transmit the chime signal across each wire of the two-wire interface;
    a chime controller, electrically connected to the transformer and the video doorbell by the two-wire interface, the chime controller operable to receive the chime signal across at least one wire of the two-wire interface and activate a chime generator to generate a chime sound;
    a connection between the doorbell button and an internal relay connected with the chime controller, the connection bypassing the processor to generate the chime signal using power supplied from the two-wire interface by actuating the internal relay when the processor is unable to generate the chime signal; and
    wherein the video doorbell system continues to provide sufficient power to the video doorbell from the transformer via the two-wire interface so as to be able to operate the processor, video camera and wireless communication module while the doorbell button is currently depressed.

2. The video doorbell system of claim 1, wherein the chime controller is operable to receive the chime signal across either wire of the two-wire interface.

3. The video doorbell system of claim 1, wherein the chime signal is created by reducing the voltage on one of a positive sinusoid and a negative sinusoid in the power supplied between the video doorbell and the chime controller across the two-wire interface.

4. The video doorbell system of claim 1, wherein the chime signal is created by sinking extra current on negative excursions of a voltage sinusoid in the power supplied between the video doorbell and the chime controller across the two-wire interface when the doorbell button is pressed and the chime controller is operable to detect the extra current and activate the chime generator.

5. The video doorbell system of claim 1, wherein the chime signal is created by sinking extra current on negative excursions of a voltage sinusoid in the power supplied between the video doorbell and the chime controller across the two-wire interface when the doorbell button is pressed and the chime controller is operable to detect the extra current and activate the chime generator, and wherein the chime generator is a chime solenoid.

\* \* \* \* \*